(12) United States Patent
Rojer

(10) Patent No.: US 7,747,937 B2
(45) Date of Patent: Jun. 29, 2010

(54) WEB BOOKMARK MANAGER

(76) Inventor: Alan S. Rojer, 423 Walton Rd., Maplewood, NJ (US) 07040-1119

( * ) Notice: Subject to any disclaimer, the term of this patent is extended or adjusted under 35 U.S.C. 154(b) by 992 days.

(21) Appl. No.: 11/503,047

(22) Filed: Aug. 11, 2006

(65) Prior Publication Data

US 2007/0043745 A1 Feb. 22, 2007

Related U.S. Application Data

(60) Provisional application No. 60/708,534, filed on Aug. 16, 2005.

(51) Int. Cl.
*G06F 17/27* (2006.01)
(52) U.S. Cl. ..................................... 715/206
(58) Field of Classification Search ................. 715/273, 715/206
See application file for complete search history.

(56) References Cited

U.S. PATENT DOCUMENTS

| | | | |
|---|---|---|---|
| 5,115,504 A | 5/1992 | Belove et al. | |
| 5,309,359 A | 5/1994 | Katz et al. | |
| 5,423,032 A | 6/1995 | Byrd et al. | |
| 5,434,777 A | 7/1995 | Luciw | |
| 5,463,773 A * | 10/1995 | Sakakibara et al. | 707/102 |
| 5,544,360 A | 8/1996 | Lewak et al. | |
| 5,774,888 A | 6/1998 | Light | |
| 5,819,258 A | 10/1998 | Vaithyanathan et al. | |
| 5,819,260 A | 10/1998 | Lu et al. | |
| 5,842,217 A | 11/1998 | Light | |
| 5,878,406 A * | 3/1999 | Noyes | 706/55 |
| 5,917,491 A * | 6/1999 | Bauersfeld | 715/810 |
| 5,963,965 A | 10/1999 | Vogel | |
| 6,026,410 A * | 2/2000 | Allen et al. | 707/104.1 |
| 6,038,560 A * | 3/2000 | Wical | 707/5 |
| 6,100,890 A | 8/2000 | Bates et al. | |
| 6,138,128 A * | 10/2000 | Perkowitz et al. | 715/205 |
| 6,208,995 B1 * | 3/2001 | Himmel et al. | 707/104.1 |
| 6,212,522 B1 * | 4/2001 | Himmel et al. | 707/10 |
| 6,223,178 B1 * | 4/2001 | Himmel et al. | 707/10 |
| 6,247,021 B1 * | 6/2001 | Himmel et al. | 707/104.1 |
| 6,334,131 B2 | 12/2001 | Chakrabarti et al. | |

(Continued)

OTHER PUBLICATIONS

Borkar et al, Automatic Segmentation of Text Into Structured Records, May 21-24, 2001, ACM SIGMOD, pp. 175-185.*

(Continued)

*Primary Examiner*—Doug Hutton
*Assistant Examiner*—Frank D Mills

(57) ABSTRACT

A web bookmark manager processes a collection of web bookmarks to produce a richly structured presentation of the bookmark collection. The bookmark collection includes representations of resources, topics, and notice events. A notice event includes a reference to a web resource and a natural language description provided by a user. The notice description is processed by a classifier to determine topics to which the referenced web resource shall be associated. The processing of the notice description includes parsing to obtain sequences of content words, to which topics are associated. Generalizations of a topic are determined by subsequences of the associated word sequence. The presentation of a collection of bookmarks includes a chronology of notices, a ranking of topics, a taxonomy of topics, and an index of content words from topics. The presentation further includes per-topic and per-resource presentations.

19 Claims, 16 Drawing Sheets

U.S. PATENT DOCUMENTS

| | | | |
|---|---|---|---|
| 6,360,227 B1 * | 3/2002 | Aggarwal et al. | 707/102 |
| 6,389,412 B1 | 5/2002 | Light | |
| 6,424,982 B1 | 7/2002 | Vogel | |
| 6,427,175 B1 * | 7/2002 | Khan et al. | 709/245 |
| 6,493,702 B1 * | 12/2002 | Adar et al. | 707/3 |
| 6,519,602 B2 | 2/2003 | Sundaresan et al. | |
| 6,549,217 B1 * | 4/2003 | De Greef et al. | 715/745 |
| 6,571,240 B1 | 5/2003 | Ho et al. | |
| 6,631,496 B1 * | 10/2003 | Li et al. | 715/200 |
| 6,721,728 B2 | 4/2004 | McGreevy | |
| 6,810,395 B1 * | 10/2004 | Bharat | 707/4 |
| 6,832,350 B1 | 12/2004 | Bates et al. | |
| 6,934,718 B2 | 8/2005 | Davidsson | |
| 6,961,751 B1 * | 11/2005 | Bates et al. | 707/10 |
| 7,100,114 B1 | 8/2006 | Burleson | |
| 7,167,901 B1 | 1/2007 | Beadle et al. | |
| 7,203,909 B1 * | 4/2007 | Horvitz et al. | 715/765 |
| 2002/0016786 A1 * | 2/2002 | Pitkow et al. | 707/3 |
| 2002/0033847 A1 | 3/2002 | Masthoff | |
| 2002/0099784 A1 * | 7/2002 | Tran | 709/212 |
| 2003/0042690 A1 * | 3/2003 | Oki et al. | 277/628 |
| 2003/0101413 A1 * | 5/2003 | Klein et al. | 715/513 |
| 2004/0054677 A1 | 3/2004 | Mueller et al. | |
| 2004/0088158 A1 * | 5/2004 | Sheu et al. | 704/9 |
| 2004/0205499 A1 | 10/2004 | Gupta | |
| 2005/0050069 A1 * | 3/2005 | Vaschillo et al. | 707/100 |
| 2005/0267869 A1 * | 12/2005 | Horvitz et al. | 707/2 |
| 2006/0015509 A1 * | 1/2006 | Naitou | 707/10 |
| 2006/0161423 A1 * | 7/2006 | Scott et al. | 704/10 |
| 2006/0224608 A1 * | 10/2006 | Zamir et al. | 707/101 |
| 2006/0265381 A1 * | 11/2006 | Altaf et al. | 707/10 |

OTHER PUBLICATIONS

Joel L. Fagan, Automatic Phrase Indexing for Document Retrieval, Proc. 10th ACM SGIR Conf., New Orleans, LA, 1987, pp. 91-101.

Gerard Salton, Automatic Text Indexing Using Complex Identifiers, Proc. ACM Conf. Document Processing Systems, Santa Fe, NM, 1988, 135-144.

W. Bruce Croft et al., The Use of Phrases and Structured Queries in Information Retrieval, ACM Conf. on R=D in Information Retrieval, Chicago, IL, 1991, pp. 32-45.

Yoelle S. Maarek et al., Automatically Organizing Bookmarks per Contents, Computer Networks and ISDN Systems, vol. 28, Issues 7-11, 1996, p. 1321.

David Abrams et al. Information Archiving with Bookmarks, Proc. SIGCHI, LA, CA, 1998, pp. 41-48.

Fred L. Drake, The XML Bookmark Exchange Language, 1998, CNRI, http://pyxml.sourceforge.net/topics/xbel, dowloaded Aug. 1, 2006.

Mark Sanderson et al. Deriving concept hierarchies from text, Proc. SIGIR, Berkeley, CA, 1999, pp. 206-213.

Eytan Adar et al. Haystack: Per-User Information Environments, Proc. 8th IKM, KC, MO, 1999, pp. 413-422.

Susan Dumais et al. Stuff I've Seen, Proc. SIGIR, Toronto, Canada, 2003, pp. 72-79.

Adam Mathes, Folksonomies, 2004, http://www.adammathes.com/academic/computer-mediated-communication/folksonomies.html, downloaded Jul. 20, 2006.

Tony Hammond et al. Social Bookmarking Tools (I), D-Lib Magazine, vol. 11, No. 5, Apr. 2005, http://www.dlib.org/dlib/april05/hammond/04hammond.html, downloaded Jul. 20, 2006.

Ben Lund et al. Social Bookmarking Tools (II), D-Lib Magazine, vol. 11, No. 4, Apr. 2005, http://www.dlib.org/dlib/april05/lund/04lund.html, downloaded Jul. 20, 2006.

Shui-Lung Chuang et al. Taxonomy Generation for Text Segments, ACM Trans. Information Systems, vol. 23, No. 4, Oct. 2005, pp. 363-396.

* cited by examiner

FIG. 3

```
Module^1068 {
  Resource^1070 {
    Text _uri^1078;
    Set<Notice^1074> _notices^1080;
    Set<Topic^1072> _topics^1082;
  }
  Topic^1072 {
    Text _text^1084;
    Text _id^1086;
    Set<Resource^1070> _resources^1088;
    Set<Topic^1072> _genera^1090;
    Set<Topic^1072> _species^1092;
    Sequence<Word^1076> _words^1094;
  }
  Notice^1074 {
    Text _date^1096;
    Text _description^1098;
    Resource^1070 _resource^1100;
    Set<Topic^1072> _topics^1102;
  }
  Word^1076 {
    Text _text^1104;
    Text _id^1106;
    Set<Topic^1072> _topics^1108;
  }
}
```

```
Portfolio^1002 {
   // collected instances...
   Set<Notice^1074> _notices^1020;
   Set<Resource^1070> _resources^1024;
   Set<Topic^1072> _topics^1022;
   Set<Word^1076> _words^1110;
   // classification services...
   Word^1076 canonical_word^1112(Text);
   Map<Text, Word^1076> text_word^1114;
   Topic^1072 canonical_topic^1116(Topic^1072);
   Map<Text, Topic^1072> text_topic^1118;
   void topic_genera^1120(Topic^1072);
   // etc...
   Boolean topic_is_trivial^1122();
};
```

*FIG. 6*

1124 Discourse Language Relations

1126 is-word
  1128 word-has-text
  1130 word-has-topic
1132 is-topic
  1134 topic-has-text
  1136 topic-has-word
  1138 topic-has-genus
  1140 topic-has-species
  1142 topic-has-resource
1144 is-notice
  1146 notice-has-date
  1148 notice-has-resource
  1150 notice-has-description
  1152 notice-has-topic
1154 is-resource
  1156 resource-has-notice
  1158 resource-has-topic

*FIG. 7*

1160 Words Discourse

Word-web is-word$^{1126}$; word-has-text$^{1128}$ web.
Word-based is-word$^{1126}$; word-has-text$^{1128}$ based.
Word-manager is-word$^{1126}$; word-has-text$^{1128}$ manager.

*FIG. 8*

1162 Topics Discourse

```
Topic-web-based-manager is-topic^1132;
   topic-has-text^1134 'web based manager';
   topic-has-word^1136 Word-web, Word-based, Word-manager;
   topic-has-genus^1138 Topic-web-based, Topic-based-manager.
Topic-web-based is-topic^1132;
   topic-has-text^1134 'web based';
   topic-has-word^1136 Word-web, Word-based;
   topic-has-genus^1138 Topic-web, Topic-based.
```

*FIG. 9*

1164 Resources Discourse

```
'http://www.n-gon.com/freshmeat/b./'
   resource-has-notice^1156
      {
        notice-has-date^1146 2001-10-22;
        notice-has-description^1150
           'Web-based manager for bookmarks using XML, Perl';
        notice-has-topic^1152 Topic-b, Topic-web-based-manager,
           Topic-bookmarks-using-xml, Topic-perl
      },
      {
        notice-has-date^1146 2003-09-22;
        notice-has-description^1150 'b. -- web-based bookmark manager';
        notice-has-topic^1152 Topic-b, Topic-web-based-bookmark-manager
      }.
```

FIG. 10

1006 Notices Discourse

```
{
   notice-has-date¹¹⁴⁶ 2001-10-22;
   notice-has-resource¹¹⁴⁸
      'http://www.n-gon.com/freshmeat/b./';
   notice-has-description¹¹⁵⁰
      'b. -- Web-based manager for bookmarks using XML, Perl'
}.
{
   notice-has-date¹¹⁴⁶ 2002-02-25;
   notice-has-resource¹¹⁴⁸
      'http://www.public.iastate.edu/~CYBERSTACKS/CTW.htm';
   notice-has-description¹¹⁵⁰
      'Beyond Bookmarks: Schemes for Organizing the Web'
}.
```

FIG. 11

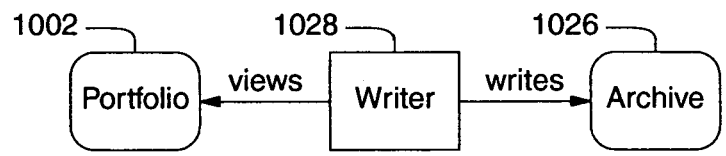

*FIG. 12*

```
writer¹⁰²⁸(Portfolio¹⁰⁰² portfolio, bookmArchive¹⁰²⁶ archive)
  // write words...
  open archive.words-discourse¹¹⁶⁰;
  foreach Word¹⁰⁷⁶ word in portfolio._words¹¹¹⁰
    write word._id¹¹⁰⁶, is-word¹¹²⁶,
      word-has-text¹¹²⁸, word._text¹¹⁰⁴;
  close archive.words-discourse¹¹⁶⁰;
  // write topics...
  open archive.topics-discourse¹¹⁶²;
  foreach Topic¹⁰⁷² topic in portfolio._topics¹⁰²² {
    write topic._id¹⁰⁸⁶, is-topic¹¹³²,
      topic-has-text¹¹³⁴, topic._text¹⁰⁸⁴;
    if (topic._words¹⁰⁹⁴)
      write topic-has-word¹¹³⁶;
      foreach Word¹⁰⁷⁶ word in topic._words¹⁰⁹⁴
        write word._id¹¹⁰⁶;
    if (topic._genera¹⁰⁹⁰) {
      write topic-has-genus¹¹³⁸;
      foreach Topic¹⁰⁷² genus in topic._genera¹⁰⁹⁰
        write genus._id¹⁰⁸⁶;
  close archive.topics-discourse¹¹⁶²;
  // write resources...
  open archive.resources-discourse¹¹⁶⁴;
  foreach Resource¹⁰⁷⁰ resource in portfolio._resources¹⁰²⁴
    write resource._uri¹⁰⁷⁸, is-resource¹¹⁵⁴;
    if (resource._notices¹⁰⁸⁰)
      write resource-has-notice¹¹⁵⁶;
      foreach Notice¹⁰⁷⁴ notice in resource._notices¹⁰⁸⁰
        write notice-has-date¹¹⁴⁶, notice._date¹⁰⁹⁶;
        write notice-has-description¹¹⁵⁰, notice._description¹⁰⁹⁸;
        if (notice._topics¹¹⁰²)
          write notice-has-topic¹¹⁵²;
          foreach Topic¹⁰⁷² topic in notice._topics¹¹⁰²
            write topic._id¹⁰⁸⁶;
  close archive.resources-discourse¹¹⁶⁴;
```

*FIG. 13*

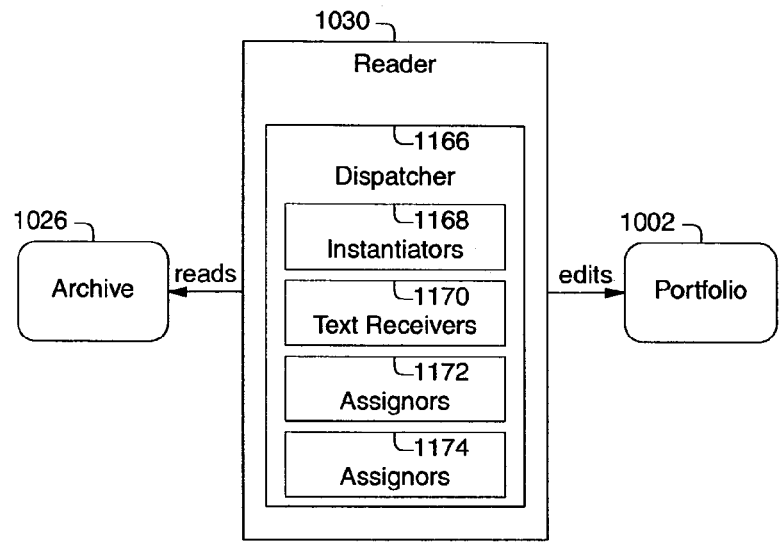

*FIG. 14*

1168 Instantiators

| Instantiator | Characteristic | Category |
|---|---|---|
| WordInstantiator[1176] | is-word[1126] | Word[1038] |
| TopicInstantiator[1178] | is-topic[1132] | Topic[1018] |
| ResourceInstantiator[1180] | is-resource[1154] | Resource[1010] |
| NoticeInstantiator[1182] | is-notice[1144] | Notice[1004] |

*FIG. 15*

1170 Text Receivers

| TextReceiver | Characteristic | Property |
|---|---|---|
| WordIdReceiver[1184] | is-word[1126] | WordID[1064] |
| TopicIdReceiver[1186] | is-topic[1132] | TopicID[1052] |
| ResourceUriReceiver[1188] | is-resource[1154] | ResourceURI[1044] |

FIG. 16

1172 Assignors

| Assignor | Relation | Property |
|---|---|---|
| WordTextAssignor[1190] | word-has-text[1128] | WordText[1062] |
| TopicTextAssignor[1192] | topic-has-text[1134] | TopicText[1050] |
| NoticeDateAssignor[1194] | notice-has-date[1146] | NoticeDate[1040] |
| NoticeDescriptionAssignor[1196] | notice-has-description[1150] | NoticeDescription[1012] |

FIG. 17

1174 Associators

| Associator | Relation | Association |
|---|---|---|
| WordTopicAssociator[1198] | word-has-topic[1130] | WordTopics[1066] |
| TopicGenusAssociator[1200] | topic-has-genus[1138] | TopicGenera[1056] |
| TopicSpeciesAssociator[1202] | topic-has-species[1140] | TopicSpecies[1058] |
| TopicResourcesAssociator[1204] | topic-has-resource[1142] | TopicResources[1054] |
| TopicWordAssociator[1206] | topic-has-word[1136] | TopicWords[1060] |
| NoticeResourceAssociator[1208] | notice-has-resource[1148] | NoticeResource[1008] |
| NoticeTopicAssociator[1210] | notice-has-topic[1152] | NoticeTopics[1042] |
| ResourceNoticeAssociator[1212] | resource-has-notice[1156] | ResourceNotices[1046] |
| ResourceTopicAssociator[1214] | resource-has-topic[1158] | ResourceTopics[1048] |

```
TopicSpecies¹⁰⁵⁸ complements TopicGenera¹⁰⁵⁶.
TopicResources¹⁰⁵⁴ complements ResourceTopics¹⁰⁴⁸.
TopicWords¹⁰⁶⁰ complements WordTopics¹⁰⁶⁶.
ResourceNotices¹⁰⁴⁶ complements NoticeResource¹⁰⁰⁸.
```

FIG. 20

1218 Classifier Grammar

```
start¹²³⁰ : ~
    | start¹²³⁰ topic¹²³² /* accept topic */
    | start¹²³⁰ topic¹²³² stop¹²³⁴ /* accept tailed topic */
    | start¹²³⁰ topic¹²³² WHITE¹²²⁰ /* accept tailed topic */
    | start¹²³⁰ stop¹²³⁴
    | start¹²³⁰ WHITE¹²²⁰
    ;
topic¹²³² : CONTENT¹²²⁸ /* start topic */
    | topic¹²³² WHITE¹²²⁰ CONTENT¹²²⁸ /* topic accept content */
    | topic¹²³² DASH¹²²⁴ CONTENT¹²²⁸ /* topic accept content */
    ;
stop¹²³⁴ : PUNCTUATION¹²²² | DASH¹²²⁴ | FUNCTION¹²²⁶ ;
```

FIG. 21

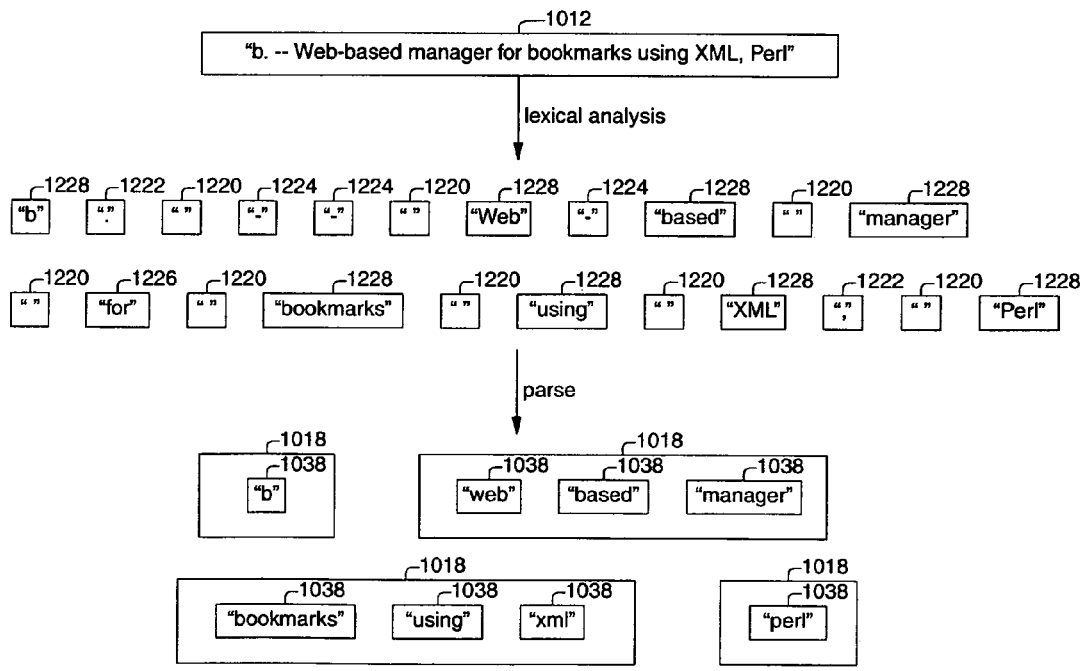

```
topic-has-genus[1138] is-transitive.
topic-has-species[1140] is-transitive.
```

WEB BOOKMARK MANAGER

CROSS-REFERENCE TO RELATED APPLICATIONS

This application claims the benefit of PPA Ser. No. 60/708,534, filed 2005 Aug. 16 by the present inventor, the disclosure of which is incorporated herein by reference.

BACKGROUND AND OBJECTS OF THE INVENTION

This invention relates particularly to management of web bookmarks, and generally to management of document assets.

The success of the world wide web has fostered the development of tools to assist users in the task of managing a surfeit of online resources. Web bookmarks, sometimes known as favorites, are one of the oldest tools for managing collections of web resources. Despite many innovations in managing bookmarks, existing systems are variously deficient, as will be described.

Even the oldest web browsers, such as Lynx and Mosaic, provided for management of a limited collection of web bookmarks. The oldest and simplest management mechanism was a flat collection, to which a user could accumulate links to selected online resources. The limitations of a flat collection become apparent as the number of bookmarks starts to exceed a few dozen.

An early innovation to bookmark management was the provision of folders for hierarchical organization of larger collections of bookmarks. In folder-oriented bookmark management, users or systems organize a bookmark collection by analogy to a file system. A folder of bookmarks may contain bookmarks or additional folders. Modern browsers and many third-party systems support folder-oriented bookmark management; such systems will be familiar to those skilled in the art. A notable resource for folder-oriented bookmark management is the XML Bookmark Exchange Language (XBEL), which permits browser-independent interchange of bookmark data. See "The XML Bookmark Exchange Language", by Fred L. Drake, Jr. (1998), available online at http://pyxml.sourceforge.net/topics/xbel/.

If the folders are organized according to specialization and generalization relationships (more general folders contain more specific folders), the user may construct a taxonomy for bookmark management, which is potentially very useful. The folder hierarchy provides a limited taxonomy since it permits only a single generalization. Folder-oriented bookmark management thus lack convenient native support for multiple generalizations in a taxonomy. XBEL and other systems augment the folder scheme with aliasing to permit a bookmark to be assigned to multiple folders, thereby alleviating to some extent the disadvantage that a singleton-genus taxonomy imposes.

Folder-oriented bookmark management permits management of arbitrarily large bookmark collections, but it imposes substantial disadvantages for the user when bookmarks are captured and retrieved. At capture time, the user must select a folder destination for a new bookmark, thus performing a classification task. At retrieval time, the user must determine the folder in which a desired bookmark resides, potentially requiring a multistep traversal of the bookmark folder hierarchy. These are non-trivial operations, especially when the bookmark collection is large and the folder hierarchy is several levels deep.

To alleviate the disadvantages of folder-oriented bookmark management, many systems have been described to automate classification and/or retrieval in folder-oriented bookmark management. Automatic classification of documents to computed categories has been actively explored in the prior art. The assignment of bookmarks to categories based on the textual content of target resources is a special case of document classification. A beneficial aspect of automatic classification is the provision of a taxonomy, in which topics are related by specialization and generalization. A disadvantage of automatic classification is that the user must substantially cede personalized characterization of a bookmark resource. Since the purposes of the user in collecting bookmarks can hardly be known to the creators of target resources, the loss of personalization cannot be easily remedied by analysis of the target resource contents.

A major advance in managing bookmarks was achieved with the introduction of tagging for bookmark collections. Tags are labels which are associated with sets of bookmarks. Tags function much like keywords; however, in practice, keywords are often associated with controlled vocabularies prepared by experts, while tagging is typically associated with communities of ordinary users. Tagging is closely related to the practice of social bookmarking, in which a community of users share bookmarks. Exemplary systems include Delicious (http://del.icio.us/) and Connotea (http://www.connotea.org/). A valuable survey of social bookmarking may be found in these papers: "Social Bookmarking Tools (I): A General Review," by Tony Hammond et. al, D-Lib Magazine 11(4), April 2005, available online at http://www.dlib.org/dlib/april05/hammond/04hammond.html; and "Social Bookmarking Tools (II): A Case Study—Connotea," by Ben Lund et. al, D-Lib Magazine 11(4), April 2005, available online at http://www.dlib.org/dlib/april05/lund/04lund.html.

Tagging alleviates the inconvenience of directly managing folders without the penalty of ceding classification to an automatic process, but the loss of a taxonomy due to the flatness of tags is disadvantageous. Moreover, tag assignment does not exploit the flexibility of natural language descriptions; obtaining a precise description of the relevance of a bookmark resource without the expressive subtlety of natural language may be difficult or impossible. Furthermore, the capability for description is available to every literate user of natural language, while effective tagging is a skill that must be acquired.

In view of the disadvantages attaching to bookmark managers in the prior art, alternatives to existing bookmark managers are desirable. An object of the present invention is to gain many of the benefits of automatic classification, including automatic computation of a taxonomy, without sacrificing the capability for user-specific personalization. Another object of the present invention is to accommodate the full expressive power of natural language in description and classification of bookmark resources. Another object is to provide a representation of a bookmark collection which is convenient for automatic processing. Another object is to provide a richly structured presentation of a bookmark collection which is convenient for browsing and informal search.

SUMMARY

A web bookmark manager processes a collection of web bookmarks to produce a richly structured presentation of the bookmark collection. The bookmark collection includes representations of resources, topics, and notice events. A notice event includes a reference to a web resource and a natural language description provided by a user. The notice description is processed by a classifier to determine topics to which the referenced web resource shall be associated. The processing of the notice description includes parsing to obtain sequences of content words, to which topics are associated. Generalizations of a topic are determined by subsequences of the associated word sequence. The presentation of a collection of bookmarks includes a chronology of notices, a ranking of topics, a taxonomy of topics, and an index of content words from topics. The presentation further includes per-topic and per-resource presentations.

BRIEF DESCRIPTION OF DRAWINGS

FIG. 3 depicts exemplary C++ class skeletons for representation of elements of a collection of web bookmarks.

FIG. 6 depicts relations that characterize an exemplary declarative language representing a bookmark collection.

FIG. 7 depicts an exemplary declarative discourse representing words.

FIG. 8 depicts an exemplary declarative discourse representing topics.

FIG. 9 depicts an exemplary declarative discourse representing resources.

FIG. 10 depicts an exemplary declarative discourse representing notices.

FIG. 11 depicts the context for an exemplary writer which views a portfolio and writes an archive.

FIG. 12 depicts an exemplary writer which views an object-oriented representation of a collection of web bookmarks and writes an archive.

FIG. 13 depicts an exemplary reader which constructs an object-oriented representation of a collection of web bookmarks from a declarative discourse.

FIG. 14 depicts exemplary instantiators, the characteristic relations to which they are responsive, and the categories for which they provide instances.

FIG. 15 depicts exemplary text receivers, the characteristic relations to which they are responsive, and the properties for which they receive entity text.

FIG. 16 depicts exemplary assignors, the relations to which they are responsive, and the properties for which they provide assignments.

FIG. 17 depicts exemplary associators, the relations to which they are responsive, and the associations which they implement.

FIG. 20 depicts an exemplary grammar for an exemplary classifier which computes topics from notice descriptions.

FIG. 21 depicts an example of the exemplary classifier processing a description in natural language to several topics.

DETAILED DESCRIPTION

1 Terminology

Figure 1:
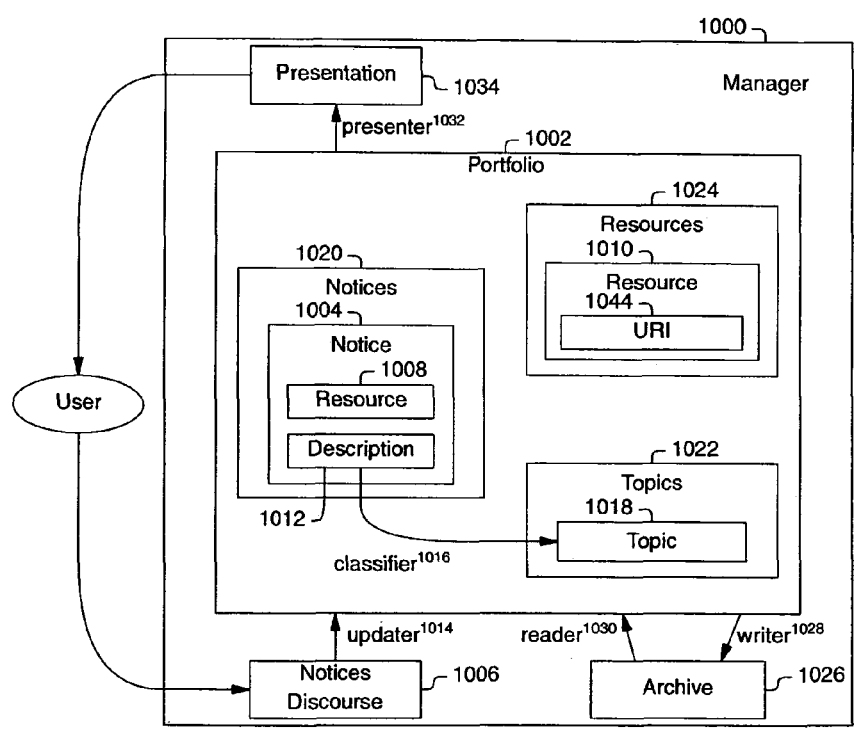
FIG. 1 depicts an exemplary web bookmark manager.

Various embodiments of the web bookmark manager may be provided in various configurations of hardware and software. A particular configuration of hardware and software is denoted a platform. Many particular aspects of an embodiment are determined by the particular characteristics of the platform. However, certain aspects of the web bookmark manager are independent of platform; to precisely characterize these aspects requires a platform-independent terminology: instance, category, feature, and model, as defined below.

An instance represents a particular element; an instance is characterized by its membership in one or more categories. A category represents a set of instances which have features in common. Examples of categories in the bookmark manager include notices, topics, and resources. A feature represents a common aspect of the instances of a category. The collection of features shared by the instances of a category are characteristic of the category. A model is a collection of categories, in which the categories may be interrelated by their features.

Features include properties and associations. A property represents the attachment of one or more scalar values to a particular instance. A scalar value is a quantity that is fully specified by its value; examples include numbers, dates, and text (strings). Typical properties include identifiers, descriptions, dates, and counts.

An association represents an interrelation between instances. Typical associations interrelate notices to resources, resources to topics, and topics to more or less general topics. An association may stand in relationship to another association; in particular, an association may have a complement. An association F is complementary to an association G if, for any pair of instances a, b, when a is F-associated to b, b is G-associated to a. An example of a pair of complementary associations is "has-parent" and "has-child". An association may be transitive. In a transitive association H, if, for any triple of instances a, b, c, when a is H-associated with b, and b is H-associated with c, then a is H-associated with c. An example of a transitive association is "has-ancestor".

To summarize, a model is characterized by a collection of categories. A category is characterized by a collection of features. Features include properties and associations. Properties attach scalar values to instances. Associations attach instances to instances. An instance is characterized by membership in one or more categories. The membership of an instance in a category is indicative of the features which are applicable to the instance.

A model describes potentialities. The categories in a model are representative of instances. The features in the categories are representative of characteristics of instances. A model is useful as a precise description and even potentially as a source for code generation and other useful products, but for most purposes, a model is utilized implicitly by operations on instantiations of the model. An instantiation of a model includes representation of instances from the categories of the model and specifications of features for those instances. A model typically permits an unbounded collection of instantiations. Moreover, a particular instantiation of some model may exist in many distinct media. Such media include a data structure of interlinked objects in random-access memory, rows in a relational database, sequential text utilizing the XML metalanguage in an operating system file, a customized text format in a file, or a proprietary binary data format in a file. An implementation of a model is a collection of facilities permitting instantiations of the model. An implementation may take the form of a collection of classes in a programming language, a schema in a database, a document type definition for XML markup, a formal language for processing textual representations, etc.

An important aspect of the bookmark manager is the classification of resources to topics according to natural language descriptions of the resources. A topic represents a set of associated resources. Topics may be organized according to generalization and specialization. A first topic generalizes a second topic when every associated resource of the second topic is also associated with the first topic. Alternatively, the first topic is denoted a genus of the second topic. Conversely, a first topic specializes a second topic when every associated resource of the first topic is also associated with the second topic. Alternatively, the first topic is denoted a species of the second topic. Generalization and specialization are complementary; if a first topic generalizes a second topic, the second topic specializes the first topic. Generalization and specialization are also transitive. When a first topic generalizes a second topic, and the second topic generalizes a third topic, the first topic generalizes the third topic. Similarly for specialization. A collection of topics related by generalization and specialization is denoted a taxonomy. A presentation of a taxonomy is denoted a thesaurus.

The classification of resources to topics by processing natural language descriptions makes use of parsing, in which the text of a natural language description is lexically analyzed to obtain tokens. The tokens are subsequently syntactically analyzed according to grammatical rules. The tokens determined by lexical analysis are associated with textual elements. These textual elements may be further processed for standardization by standardizing letter case, stemming, and even substitution of synonyms. Standardized textual elements are denoted word types. A sequence of standardized textual elements is denoted a phrase; phrases are associated with topics. When a phrase has a nonempty subsequence, the topic associated with the nonempty subsequence is associated as a generalization of the topic associated with the original phrase.

2 Overview

FIG. 1 depicts an exemplary web bookmark manager. A bookmark manager 1000 consists of representations and computations useful for the management of a collection of web bookmarks. A portfolio 1002 represents a collection of web bookmarks. A user, upon taking notice of an interesting web resource, provides an instance of a notice-category 1004, which is collected along with other notices in a notices-discourse 1006. The notice-category 1004 includes a notice-resource-association 1008, which is associated with a representation of the web resource; the web resource is represented by an instance of a resource-category 1010. The notice-category 1004 further includes a notice-description-property 1012, which is a natural language description of the web resource, ideally taking particular note of the relevance of the web resource to the user's interests.

One or more instances of the notice-category 1004 are integrated into the portfolio 1002 by an updater 1014. In the updater 1014, the notice-description-property 1012 is processed by a classifier 1016, which may determine one or more instances of a topic-category 1018. The instances of the notice-category 1004 provided by the user are collected in a portfolio-notices 1020. The instances of the topic-category 1018 computed from the notice-description-property 1012 are collected in a portfolio-topics 1022. The instances of the resource-category 1010 representing the web resources noticed by the user are collected in a portfolio-resources 1024.

The portfolio 1002 is written to an archive 1026 by a writer 1028. The archive 1026 is read by a reader 1030 to restore the portfolio 1002. A presenter 1032 creates a presentation 1034, which presents the contents of the portfolio 1002 in a fashion suitable for review by the user.

3 Model

Figure 2:
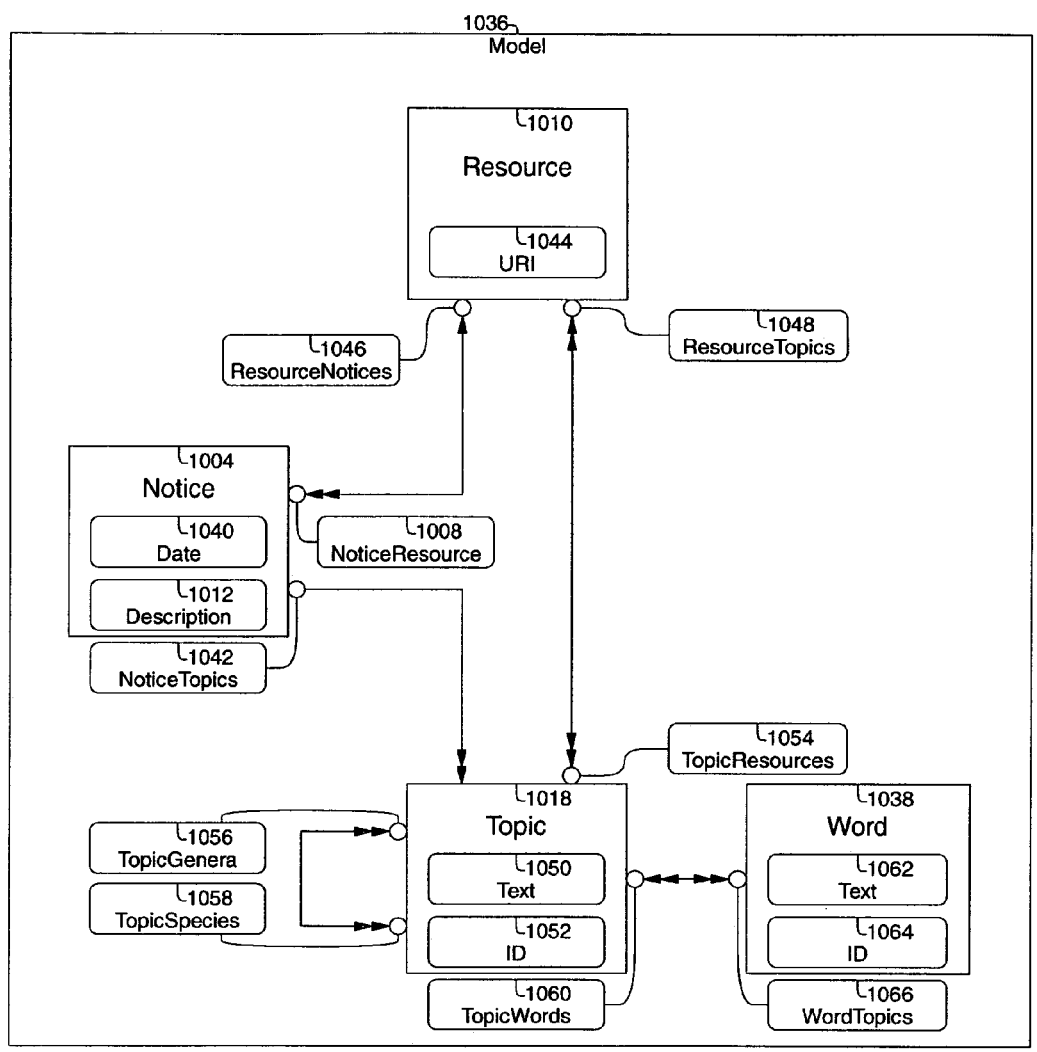
FIG. 2 depicts an exemplary model for representation of a collection of web bookmarks.

FIG. 2 depicts an exemplary model for representation of a collection of web bookmarks. In an exemplary embodiment of the invention, the bookmark manager 1000 includes a model 1036, which in turn includes categories and features which are representative of elements of a collection of web bookmarks. The model 1036 includes the resource-category 1010, an instance of which represents a web resource that has been noticed by a user. The model 1036 further includes the topic-category 1018, an instance of which represents a classification element for grouping resources. The model 1036 further includes the notice-category 1004, an instance of which represents the event of a user noticing a web resource. The model 1036 further includes a word-category 1038, an instance of which represents a word-type element in a standardized form.

An instance of the notice-category 1004 represents the event of a user taking notice of a web resource. The notice-category 1004 has the notice-resource-association 1008 referencing the resource-category 1010. The notice-resource-association 1008 identifies the instance of the resource-category 1010 which was noticed. The notice-category 1004 has the notice-description-property 1012 representing the user's description of the resource. The notice-category 1004 has a notice-date-property 1040 representing the date upon which the notice event took place. The notice-category 1004 has a plural notice-topics-association 1042 referencing the topic-category 1018. The notice-topics-association 1042 represents the instances of the topic-category 1018 which are determined by textual analysis of the notice-description-property 1012 of a particular notice by the classifier 1016.

An instance of the resource-category 1010 represents a web resource that has been noticed by a user. The resource-category 1010 has a resource-URI-property 1044 which uniquely identifies the web resource using a uniform resource identifier (per RFC 2396). The resource-category 1010 has a plural resource-notices-association 1046, referencing the notice-category 1004. The resource-notices-association 1046 represents the collection of instances of the notice-category 1004 which took notice of a particular resource instance. The resource-notices-association 1046 is complementary to the notice-resource-association 1008. The resource-category 1010 has a plural resource-topics-association 1048 referencing the resource-category 1010. The resource-topics-association 1048 represents the collection of instances of the topic-category 1018 to which a particular resource instance has been classified. In an alternative embodiment, instances of the topic-category 1018 are indirectly associated with the resource-category 1010 via the resource-notices-association 1046 and the notice-topics-association 1042.

An instance of the topic-category 1018 represents a classification element for grouping resources. The topic-category 1018 has a topic-text-property 1050 which provides a textual expression of the topic. The topic-category 1018 has a topic-id-property 1052 which uniquely identifies the instance as an entity (for use in the archive 1026). The topic-text-property 1050 is inadequate as a unique identifier since an instance of the word-category 1038 may have identical text. The topic-category 1018 has a plural topic-resources-association 1054, referencing the resource-category 1010. Alternatively, a complement to the notice-topics-association 1042 could be provided in the topic-category 1018, in which case the associated resources could be indirectly determined via the notice-resource-association 1008. The topic-resources-association 1054 represents the grouped instances of the resource-category 1010 which have been assigned to a particular topic instance. The topic-resources-association 1054 is complementary to the resource-topics-association 1048.

The topic-category 1018 has a plural topic-genera-association 1056 referencing the topic-category 1018. The topic-genera-association 1056 represents a collection of instances of the topic-category 1018 which are more general classification elements relative to a particular topic instance. For a particular topic, the instances of the topic-resources-association 1054 of a genus topic form a superset of the instances of the topic-resources-association 1054 of the particular topic. Equivalently, if a particular topic has a genus topic, than any resource associated with the particular topic is associated with the genus topic, but not necessarily vice versa. The topic-genera-association 1056 is transitive.

The topic-category 1018 has a plural topic-species-association 1058 referencing the topic-category 1018. The plural topic-species-association 1058 represents a collection of instances of the topic-category 1018 which are more specific classification elements relative to a particular topic instance. For a particular topic, the topic-resources-association 1054 of a species topic form a subset of the topic-resources-association 1054 of the particular topic. Equivalently, if a particular topic has a species topic, than any resource associated with the species topic is associated with the particular topic, but not necessarily vice versa. The topic-species-association 1058 is transitive. The topic-species-association 1058 is complementary to the topic-genera-association 1056. The topic-genera-association 1056 and the topic-species-association 1058 define a taxonomy of topics.

The topic-category 1018 has a plural topic-words-association 1060, referencing the word-category 1038. The topic-words-association 1060 represents the topic as a phrase, in which the phrase constituents are standardized word-type elements.

An instance of the word-category 1038 represents a word-type element in a standardized form. The standardized form may include normalization of case (capitalization), stemming (e.g., normalization of markers of the plural, gerunds, tense, etc.) and substitution of synonyms. The word-category 1038 has a word-text-property 1062 which represents the standardized form of the word-type element which is represented by the word instance. The word-category 1038 has a word-id-property 1064 which uniquely identifies the instance as an entity. The word-text-property 1062 is inadequate as a unique identifier since an instance of the topic-category 1018 may have identical text. The word-category 1038 has a plural word-topics-association 1066 referencing the topic-category 1018. For a particular word, the word-topics-association 1066 represents the instances of the topic-category 1018 which incorporate the particular word instance as part of the topic instance's self-representation as a phrase. The word-topics-association 1066 is complementary to the topic-words-association 1060.

In an alternative embodiment, the word-category 1038 may be defined as a specialization of the topic-category 1018, corresponding to a singleton sequence of instances of the word-category 1038.

4 Module

In an exemplary embodiment of the invention, the bookmark manager 1000 includes a module 1068, which implements the categories and features of the model 1036 using C++ classes. The model 1036 includes categories and features of those categories. In an exemplary embodiment, a category is represented by a C++ class. The features of the category are represented by the members of the corresponding class. At run time, an instance of a category is represented by an object instantiated by invocation of a constructor of the corresponding class. Assignment to a member of the object corresponds to specification of a property or an association of the instance. A collection of web bookmarks may thus be represented by an object-oriented data structure. The data structure includes objects from the module's classes, corresponding to instances of the categories. The members of the objects are populated in correspondence to properties and associations of the category instances.

FIG. 3 depicts exemplary C++ class skeletons for representation of elements of a collection of web bookmarks. The module 1068 includes classes implementing the categories of the model 1036. A resource-class 1070 implements the resource-category 1010. A topic-class 1072 implements the topic-category 1018. A notice-class 1074 implements the notice-category 1004. A word-class 1076 implements the word-category 1038.

The resource-class 1070 implements the resource-category 1010. The resource-class 1070 has a resource-URI-text 1078, implementing the resource-URI-property 1044. The resource-class 1070 has a resource-notices-set 1080, implementing the resource-notices-association 1046. The resource-notices-set 1080 refers to objects of the notice-class 1074. The resource-class 1070 has a resource-topics-set 1082, implementing the resource-topics-association 1048. The resource-topics-set 1082 refers to objects of the topic-class 1072.

The topic-class 1072 implements the topic-category 1018. The topic-class 1072 has a topic-text-text 1084, implementing the topic-text-property 1050. The topic-class 1072 has a topic-id-text 1086, implementing the topic-id-property 1052. The topic-class 1072 has a topic-resources-set 1088, implementing the topic-resources-association 1054. The topic-resources-set 1088 refers to objects of the resource-class 1070. The topic-class 1072 has a topic-genera-set 1090 implementing the topic-genera-association 1056. The topic-genera-set 1090 refers to objects of the topic-class 1072. The topic-class 1072 has a topic-species-set 1092 implementing the topic-species-association 1058. The topic-species-set 1092 refers to objects of the topic-class 1072. The topic-class 1072 has a topic-words-sequence 1094, implementing the topic-words-association 1060. The topic-words-sequence 1094 refers to objects of the word-class 1076.

The notice-class 1074 implements the notice-category 1004. The notice-class 1074 has a notice-date-text 1096, implementing the notice-date-property 1040. The notice-class 1074 has a notice-description-text 1098, implementing the notice-description-property 1012. The notice-class 1074 has a notice-resource-reference 1100, implementing the notice-resource-association 1008. The notice-resource-reference 1100 refers to an object of the resource-class 1070. The notice-class 1074 has a notice-topics-set 1102, implementing the notice-topics-set 1102. The notice-topics-set 1102 refers to objects of the topic-class 1072.

The word-class 1076 implements the word-category 1038. The word-class 1076 has a word-text-text 1104, implementing the word-text-property 1062. The word-class 1076 object has a word-id-text 1106, implementing the word-id-property 1064. The word-class 1076 has a word-topics-set 1108, implementing the word-topics-association 1066. The word-topics-set 1108 refers to objects of the topic-class 1072.

5 Alternatives to Module

In an exemplary embodiment the module 1068 implements the model 1036. The module 1068 permits instantiation of the model 1036 as an object-oriented data structure, where the objects are constructed via C++ classes. Other programming languages could be used to implement the model; implementations in C# or JAVA would closely follow the C++ module. For a scripting language such as Perl, Python, or Ruby, some details would need adaptation, such as provision for a set. To implement the model using a non-object-oriented language would require additional efforts but no particular difficulties for one skilled in the art.

Other embodiments may be also provided which implement the model 1036 in representations that are not directly compatible with a programming language. An instantiation of the model 1036 may be represented with a declarative discourse, as will be described below, in which case the instantiation has a textual representation which may be stored on a persistent digital medium such as a CD-ROM or a hard disk.

An instantiation of the model 1036 may be provided using an XML expression. In such an expression, instances of the categories of the model 1036 are represented by tagged XML elements. Properties and associations of the instances of the categories are represented by a combination of attributes and tagged XML elements.

An instantiation of the model 1036 may be provided using a relational database. Categories of the model 1036 are implemented as tables; each row of such a table represents an instance of a category. The singleton properties and associations of the model 1036 are implemented with columns of the table representing the category. A plural property or association is implemented by an additional table using a foreign key to refer to the subject instances and, in case of associations, object instance.

6 Portfolio

In an exemplary embodiment, the bookmark manager 1000 includes the portfolio 1002, a C++ class which represents a collection of web bookmarks as an interlinked object-oriented data structure, the elements of which are instantiated from the classes of the module 1068. An instance of the portfolio 1002 represents an instantiation of the model 1036, in which instances from the categories of the model 1036, implemented by objects from the classes of the module 1068, are provided for use in operations. An instantiated object of the portfolio 1002 represents a particular collection of web bookmarks.

Figures 4, 5:
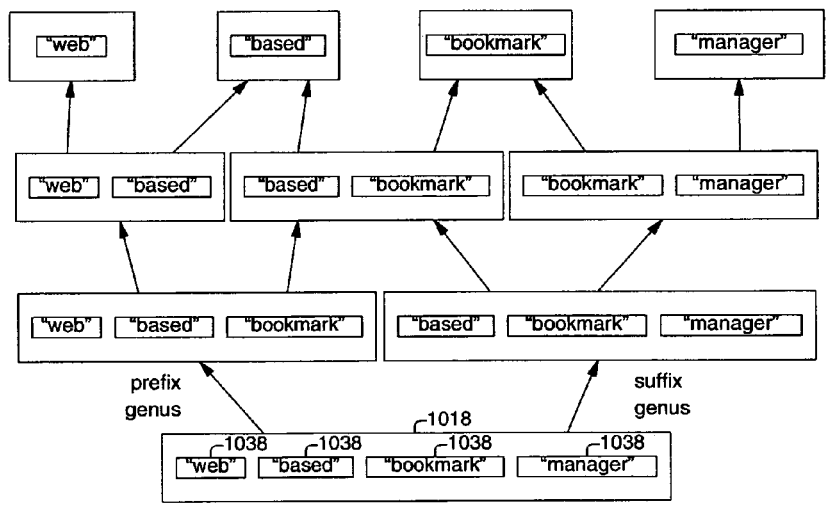
FIG. 4 depicts an exemplary C++ class skeleton providing an object-oriented representation of a collection of web bookmarks.
FIG. 5 depicts an exemplary computation of genera from a topic.

FIG. 4 depicts an exemplary C++ class skeleton providing an object-oriented representation of a collection of web bookmarks. An instantiated object of the portfolio 1002 provides collections of objects for each of notices, topics, resources, and words. These collections are under the memory management of the portfolio 1002. The set portfolio-notices 1020 collects objects of the notice-class 1074. The set portfolio-resources 1024 collects objects of the resource-class 1070. The set portfolio-topics 1022 collects objects of the topic-class 1072. A set portfolio-words 1110 collects objects of the word-class 1076.

The portfolio 1002 provides a convenient site for classification services which are used in the computation of topics from notice descriptions. In an alternative embodiment, these computations could be provided as part of the classifier 1016 or in a distinct class or service. The portfolio 1002 computes a canonical word-type from supplied text. The portfolio 1002 computes a canonical topic from a supplied topic. The portfolio 1002 computes genera for a supplied topic.

The portfolio 1002 provides a computation canonical-word 1112 which computes a canonical object of the word-class 1076 from supplied text. In the computation, the supplied text is standardized; the standardization may include letter case, stemming, synonym preferences, etc. If no object of the word-class 1076 has previously been associated with the standardized text, a new object of the word-class 1076 is constructed and associated with the standardized text. The associations of standardized text with canonical objects of the word-class 1076 are maintained by a text-word-map 1114. The associated object of the standardized text provides the computed canonical word.

The portfolio 1002 provides a computation canonical-topic 1116 which computes a canonical object of the topic-class 1072 from a supplied object of the topic-class 1072. A standardized identifier for the canonical topic is computed from a concatentation of the text of the objects of the word-class 1076 associated with the supplied topic via the supplied topic's topic-words-sequence 1094. If no topic has previously been associated with the standardized identifier, the supplied topic is associated with the standardized identifier. The associations of standardized identifiers with canonical objects of the topic-class 1072 are maintained by a text-topic-map 1118. Genera are separately computed for the supplied topic, as described below. The supplied topic provides the computed canonical topic. Otherwise, where a topic has been previously associated with the standardized identifier, the supplied topic is deleted, and the previously associated topic provides the computed canonical topic.

The portfolio 1002 provides a computation topic-genera-computation 1120, which computes genera for a supplied object of the topic-class 1072. The supplied topic has an associated sequence of words, the topic-words-sequence 1094. If the associated sequence of words has more than one word, a prefix genus topic is formed from the associated sequence of words with the last word omitted. A suffix genus topic is formed from the associated sequence of words with the first word omitted. The prefix and suffix genera are each standardized to a canonical topic, via the canonical-topic 1116. The canonical prefix and suffix genera are associated with the supplied topic.

FIG. 5 depicts an exemplary computation of genera from a topic. An instance of the topic-category 1018 is depicted at the base of the figure, for which the topic-words-association 1060 includes instances of the word-category 1038 respectively corresponding to the texts "web", "based", "bookmark", and "manager". A prefix genus is computed, including instances of the word-category 1038 respectively corresponding to the texts "web", "based", and "bookmark". A suffix genus is computed, including instances of the word-category 1038 respectively corresponding to the texts "based", "bookmark", and "manager". Canonical topics are obtained for the prefix and suffix genera via the canonical-topic 1116. The genus computation is invoked recursively in the canonical-topic 1116 when a new canonical topic is determined. The remainder of the genera graph shown in the Figure is thus constructed if it does not already exist. An alternative embodiment treats a phrase as a set, not a sequence, and identifies genera with subsets, not subsequences.

The portfolio 1002 provides a computation topic-triviality 1122 which determines the triviality of an object of the topic-class 1072. A topic is trivial if it has one or less associated resources, or if any of its species has as many associated resources as the topic.

7 Discourse

The bookmark manager 1000 includes a formal language 1124 which permits a textual representation of a collection of web bookmarks. The language 1124 consists of declarative discourse expressed in the antic meta language, which is described in U.S. patent application Ser. No. 11/023,205, "Method of Processing Databases", filed 2004Dec., 24, by the present inventor, incorporated herein by reference.

As an application of the antic meta language, the language 1124 consists of expressions which instantiate entities and interrelate entities in declarations. The entities of the discourse represent instances of the categories of the model 1036 as well as textual entities specifying the values of properties. An entity may optionally be associated with unique text; for entities representing instances, the unique text is an identifier for the instance. For entities representing property values, the text represents the value of the property.

A declaration includes a subject entity and a relation; an optional object entity may also be included. An entity may represent an instance or the value of a property. The relations of the discourse represent relationships specifying categories and features of the instances. The declarations of the discourse specify category membership of the instances, properties of the instances, and associations between instances. Expressions in the discourse permit more than one declaration to be economically expressed by combining multiple subjects, predicates, and objects.

FIG. 6 depicts relations that characterize an exemplary declarative language representing a bookmark collection. The language 1124 is characterized by the particular relations which indicate category membership, properties, and associations.

An is-word-characteristic 1126 indicates membership in the word-category 1038. A word-has-text-relation 1128 specifies the word-text-property 1062 for an instance of the word-category 1038. A word-has-topic-relation 1130 specifies the word-topics-association 1066 for an instance of the word-category 1038.

An is-topic-characteristic 1132 indicates membership in the topic-category 1018. A topic-has-text-relation 1134 specifies the topic-text-property 1050 for an instance of the topic-category 1018. A topic-has-word-relation 1136 specifies the topic-words-association 1060 for an instance of the topic-category 1018. A topic-has-genus-relation 1138 specifies the topic-genera-association 1056 for an instance of the topic-category 1018. A topic-has-species-relation 1140 specifies the topic-species-association 1058 for an instance of the topic-category 1018. A topic-has-resource-relation 1142 specifies the topic-resources-association 1054 for an instance of the topic-category 1018.

An is-notice-characteristic 1144 indicates membership in the notice-category 1004. A notice-has-date-relation 1146 specifies the notice-date-property 1040 for an instance of the notice-category 1004. A notice-has-resource-relation 1148 specifies the notice-resource-association 1008 for an instance of the notice-category 1004. A notice-has-description-relation 1150 specifies the notice-description-property 1012 for an instance of the notice-category 1004. A notice-has-topic-relation 1152 specifies the notice-topics-association 1042 for an instance of the notice-category 1004.

An is-resource-characteristic 1154 indicates membership in the resource-category 1010. A resource-has-notice-relation 1156 specifies the resource-notices-association 1046 for an instance of the resource-category 1010. A resource-has-topic-relation 1158 specifies the resource-topics-association 1048 for an instance of the resource-category 1010.

8 Archive

The archive 1026 represents a collection of bookmarks by describing an instantiation of the model 1036 for persistent storage in digital media, such as an operating system file. The archive 1026 uses the language 1124 to represent a bookmark collection.

FIG. 7 depicts an exemplary declarative discourse representing words. A words-discourse 1160 declares words and indicates the text for each word. The words-discourse 1160 includes expressions representative of instances of the word-category 1038. Three such expressions are shown in the Figure. In the first expression, a subject entity identified by the text "Word-web" is predicated on the is-word-characteristic 1126, thereby indicating membership in the word-category 1038. After a semicolon, which indicates that another predicate is supplied for the same subject entity, the word-has-text-relation 1128 expresses the property word-text-property 1062; in this expression, the property value is specified as the text "web". The expression is terminated with a period. The other expressions are similar in structure, with distinct identifiers for the entity representing the word-category 1038, and distinct values for the word-text-property 1062.

FIG. 8 depicts an exemplary declarative discourse representing topics. A topics-discourse 1162 declares topics, indicates the text for each topic, the words associated with the topic, and a prefix genus and a suffix genus, if any. The topics-discourse 1162 includes expressions representative of instances of the topic-category 1018. Two such expressions are shown in the Figure. In the first expression, a subject entity identified by the text "Topic-web-based-manager" is predicated on the is-topic-characteristic 1132, thereby indicating membership in the category topic-category 1018. After the semicolon, the topic-has-text-relation 1134 expresses the topic-text-property 1050. This expression specifies the value of the property as the text "web based manager".

Another semicolon delimits a distinct predicate, in which the topic-has-word-relation 1136 expresses the topic-words-association 1060. In this predicate, three objects are indicated, separated by commas. Each object implies a distinct declaration, with common subject and relation. The objects predicated on the topic-words-association 1060 are instances of the word-category 1038. In this predicate, the particular instances of the word-category 1038 are identified by "Word-web", "Word-based", and "Word-manager", respectively.

Another semicolon delimits a distinct predicate, in which the topic-has-genus-relation 1138 expresses the topic-genera-association 1056. In this predicate, two objects are indicated. The objects predicated are instances of the topic-category 1018, identified by "Topic-web-based" and "Topic-based-manager". These topics are the prefix and suffix genera determined by the topic-genera-computation 1120.

FIG. 9 depicts an exemplary declarative discourse representing resources. A resources-discourse 1164 declares resources and indicates the notices associated with each resource. The date, description, and associated topics for each notice are declared in the resources discourse. The resources-discourse 1164 includes expressions representative of instances of the resource-category 1010. One such expression is shown in the Figure. In the expression, a subject entity identified by the text "http://www.n-gon.com . . . " is predicated on the resource-has-notice-relation 1156, which expresses the resource-notices-association 1046. Two objects are indicated in this predicate, representing instances of the notice-category 1004. The notice objects are anonymously expressed using curly brackets, which indicate an entity lacking optional text. There is no particular need to name instances of the notice-category 1004.

The instances of the notice-category 1004 which are represented by the objects are characterized by provision of date, description, and associated topics. In the first object, the anonymous entity representing an instance of the notice-category 1004 is predicated on the notice-has-date-relation 1146, which expresses the notice-date-property 1040. The property value is indicated at "2001-10-22". The anonymous entity is predicated on the notice-has-description-relation 1150, which expresses the notice-description-property 1012. The property value is indicated as "Web-based manager . . . ". The anonymous entity is predicated on the notice-has-topic-relation 1152, which expresses the notice-topics-association 1042. The objects of the notice-has-topic-relation 1152 are representative of instances of the topic-category 1018. In this predicate, four objects are indicated, of the which the first two are identified as "Topic-b" and "Topic-web-based-manager".

FIG. 10 depicts an exemplary declarative discourse representing notices. Additional notices intended for incorporation to a bookmark collection are provided in a notices-discourse 1006. The notices-discourse 1006 includes a sequence of expressions, each of which describes a notice with a date, resource, and description. Two such expressions are shown in the Figure. The first expression describes an anonymous entity, representing an instance of the notice-category 1004. The entity is predicated on the notice-has-date-relation 1146, which expresses the notice-date-property 1040. The property value is indicated at "2001-10-22". The entity is also predicated on the notice-has-resource-relation 1148, which expresses the notice-resource-association 1008. The object indicates the associated instance of the resource-category 1010 identified by the text "http://www.n-gon.com . . . ". The entity is also predicated on the notice-has-description-relation 1150, which expresses the notice-description-property 1012. The property value is indicated as "Web-based manager . . . ". The notices described in this discourse have not yet been analyzed to determine associated topics.

9 Writer

FIG. 11 depicts the context for an exemplary writer which views a portfolio and writes an archive. An exemplary embodiment of the bookmark manager 1000 includes a writer 1028 which writes an archive representative of a bookmark collection. The writer 1028 operates on a portfolio 1002, computing an archive 1026. The portfolio 1002 is unaffected by the operation.

FIG. 12 depicts an exemplary writer which views an object-oriented representation of a collection of web bookmarks and writes an archive. The writer 1028 writes the words-discourse 1160. For each instance of the word-class 1076 in the portfolio-words 1110 of the supplied portfolio 1002, the word-id-text 1106 and the word-text-text 1104 are written, suitably related via the is-word-characteristic 1126 and the word-has-text-relation 1128, respectively.

The writer 1028 writes the topics-discourse 1162. For each instance of the topic-class 1072 in the portfolio-topics 1022 of the supplied portfolio 1002, the topic-id-text 1086 and the topic-text-text 1084 are written, suitably related via the is-topic-characteristic 1132 and the topic-has-text-relation 1134, respectively. If the topic-words-sequence 1094 is non-empty, a predicate topic-has-word-relation 1136 is written, and, for each associated object of the word-class 1076, the word-id-text 1106 is written. If the topic-genera-set 1090 is non-empty, a predicate topic-has-genus-relation 1138 is written, and, for each associated object of the topic-class 1072, the topic-id-text 1086 is written.

The writer 1028 writes the resources-discourse 1164. For each object of the resource-class 1070 in the portfolio-resources 1024 of the supplied portfolio 1002, the resource-URI-text 1078 is written, serving as a unique identifier for the resource instance. If the resource-notices-set 1080 is non-empty, a predicate resource-has-notice-relation 1156 is written, and, for each associated object of the notice-class 1074, the notice-date-text 1096 is written, predicated on the notice-has-date-relation 1146. The notice-description-text 1098 is also written, predicated on the notice-has-description-relation 1150. If the notice-topics-set 1102 is non-empty, a predicate notice-has-topic-relation 1152 is written, and, for each associated object of the topic-class 1072, the topic-id-text 1086 is written.

10 Reader

An exemplary embodiment of the bookmark manager 1000 includes a reader 1030, which mediates the construction of the interlinked object-oriented data structures of the portfolio 1002 from an archive 1026 in the language 1124.

FIG. 13 depicts an exemplary reader which constructs an object-oriented representation of a collection of web bookmarks from a declarative discourse. A reader 1030 operates on an archive 1026, editing a portfolio 1002. The archive 1026 is unaffected by the operation.

The reader 1030 uses a dispatcher 1166 which contains a collection instantiators 1168, a collection receivers 1170, a collection assignors 1172, and a collection associators 1174. The elements of these collections are responsive to declarations in the archive 1026 discourse. The instantiators, assignors, and associators mediate the population of the portfolio 1002. The dispatcher 1166 is further augmented with declarations establishing useful meta relations.

The dispatcher 1166 contains the collection instantiators 1168. Each instantiator is responsible for instantiation of an instance of a particular category in response to dispatch of a declaration in which a subject entity is combined with a particular characteristic relation. Each instantiator additionally provides a resolution service in which an associated instance, if any, is provided for a supplied entity.

FIG. 14 depicts exemplary instantiators, the characteristic relations to which they are responsive, and the categories for which they provide instances. A word-instantiator 1176 provides instantiation for the word-category 1038, responsive to the is-word-characteristic 1126. A topic-instantiator 1178 provides instantiation for the topic-category 1018, responsive to the is-topic-characteristic 1132. A resource-instantiator 1180 provides instantiation for the resource-category 1010, responsive to the is-resource-characteristic 1154. A notice-instantiator 1182 provides instantiation for the notice-category 1004, responsive to the is-notice-characteristic 1144.

The dispatcher 1166 contains the collection receivers 1170. Each receiver is responsible for assigning the text which uniquely identifies a particular entity to a text member in an object which represents an instance of a category in an object-oriented data structure. Receivers are responsive to dispatch of characteristic relations.

FIG. 15 depicts exemplary text receivers, the characteristic relations to which they are responsive, and the properties for which they receive entity text. A word-id-receiver 1184, responsive to the is-word-characteristic 1126, receives entity text for the word-id-property 1064. A topic-id-receiver 1186, responsive to the is-topic-characteristic 1132, receives text for the topic-id-property 1052. A resource-url-receiver 1188, responsive to the is-resource-characteristic 1154, receives text for the resource-URI-property 1044.

The dispatcher 1166 contains the collection assignors 1172. Each assignor is responsible for assignment of properties in instantiated instances of a particular category in response to dispatch of a declaration in which a subject entity is coupled to a textual object via a particular relation.

FIG. 16 depicts exemplary assignors, the relations to which they are responsive, and the properties for which they provide assignments. A word-text-assignor 1190, responsive to the word-has-text-relation 1128, implements the word-text-property 1062. A topic-text-assignor 1192, responsive to the topic-has-text-relation 1134, implements the topic-text-property 1050. A notice-date-assignor 1194, responsive to the notice-has-date-relation 1146, implements the notice-date-property 1040. A notice-description-assignor 1196, responsive to the notice-has-description-relation 1150, implements the notice-description-property 1012.

The dispatcher 1166 contains the collection associators 1174. Each associator is responsible for association of instances of particular subject and object categories in response to dispatch of a declaration in which a subject entity is coupled to an object entity via a particular relation.

FIG. 17 depicts exemplary associators, the relations to which they are responsive, and the associations which they implement. A word-topic-associator 1198, responsive to the word-has-topic-relation 1130, implements the word-topics-association 1066. A topic-genus-associator 1200, responsive to the topic-has-genus-relation 1138, implements the topic-genera-association 1056. A topic-species-associator 1202, responsive to the topic-has-species-relation 1140, implements the topic-species-association 1058. A topic-resource-associator 1204, responsive to the topic-has-resource-relation 1142, implements the topic-resources-association 1054. A topic-word-associator 1206, responsive to the topic-has-word-relation 1136, implements the topic-words-association 1060. A notice-resource-associator 1208, responsive to the notice-has-resource-relation 1148, implements the notice-resource-association 1008. A notice-topic-associator 1210, responsive to the notice-has-topic-relation 1152, implements the notice-topics-association 1042. A resource-notice-associator 1212, responsive to the resource-has-notice-relation 1156, implements the resource-notices-association 1046. A resource-topic-associator 1214, responsive to the resource-has-topic-relation 1158, implements the resource-topics-association 1048.

Figures 18, 19:
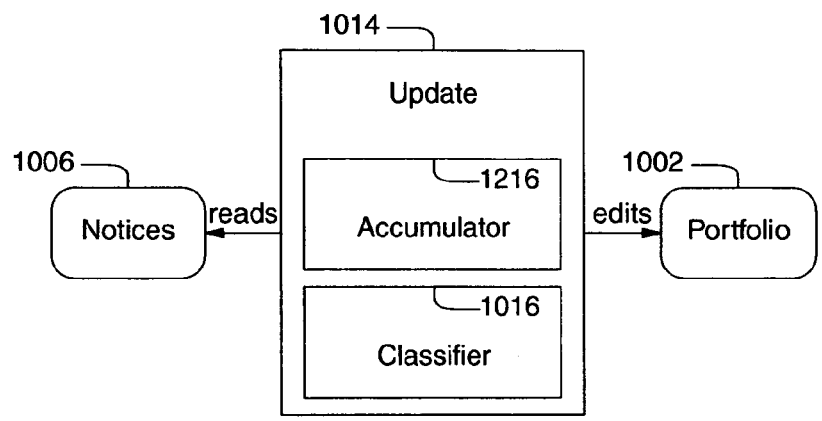
FIG. 18 depicts exemplary declarations establishing meta relations in the dispatcher.
FIG. 19 depicts an exemplary updater in which a notices discourse is read and a portfolio is edited to incorporate the notices.

FIG. 18 depicts exemplary declarations establishing meta relations in the dispatcher. A declaration establishes the complementarity of the topic-species-association 1058 and topic-genera-association 1056. A declaration establishes the complementarity of the topic-resources-association 1054 and resource-topics-association 1048. A declaration establishes the complementarity of the topic-words-association 1060 and word-topics-association 1066. A declaration establishes the complementarity of the resource-notices-association 1046 and notice-resource-association 1008.

11 Update

FIG. 19 depicts an exemplary updater in which a notices discourse is read and a portfolio is edited to incorporate the notices. The bookmark manager 1000 includes a updater 1014, which reads the notices-discourse 1006, editing a portfolio 1002. The updater 1014 makes use of a notice-accumulator 1216. The notice-accumulator 1216 is a custom responder which is engaged while processing the notices-discourse 1006. The notice accumulator is dispatched on the is-notice-characteristic 1144. The notice accumulator collects objects of the notice-class 1074 as they are instantiated during the processing of the discourse. When the discourse processing is complete, the notice-description-text 1098 of each accumulated notice is processed by the classifier 1016 to determine topics to be associated with each accumulated notice.

12 Classifier

An exemplary embodiment of the bookmark manager 1000 includes the classifier 1016, which provides an automatic determination of topics for classification of web resources from natural language descriptions. The classifier 1016 is used in the updater 1014 which incorporates new notices into an existing portfolio 1002.

FIG. 20 depicts an exemplary grammar for an exemplary classifier which computes topics from notice descriptions. The classifier 1016 processes a textual description in the context of a particular portfolio 1002 and a particular object of the notice-class 1074. The classifier may determine one or more objects of the topic-class 1072 for the notice-topics-set 1102. The classifier uses a formal grammar 1218 to process natural language textual descriptions.

A description is parsed into lexical tokens (terminals) in accordance with the grammar 1218. A terminal white-space 1220 represents white space. A terminal punctuation 1222 represents ordinary punctuation. A terminal dash 1224 represents a special case of punctuation, recognizing the phrase-like characteristic of dash-connected word pairs. An alternative embodiment might similarly provide for phrase-like characteristics of other embedded punctuation, including, e.g. slash.

A terminal function-word 1226 represents function words, which are relatively free of content, e.g. "the", "a", "of", etc.

A terminal content-word 1228 represents content words which are indicative of content. Content words include any words which are not recognized as function words.

A complete description is represented by a nonterminal start 1230. A sequence of content words, corresponding to a phrase in natural language, is represented by a nonterminal topic 1232. A delimiter of a sequence of content words is represented by a nonterminal stop 1234.

The nonterminal start 1230 represents a complete description. In a first start rule, an empty description is accepted; no action is required. In a second start rule, a description followed by a topic 1232 is accepted; the accepted topic 1232 is separately processed as described below. In a third start rule, a description followed by a topic 1232 followed by a stop 1234 is accepted; the accepted topic 1232 is separately processed as described below. In a fourth start rule, a description followed by a topic 1232 followed by a white-space 1220 is accepted; the accepted topic 1232 is separately processed as described below. In a fifth start rule, a description followed by a stop 1234 is accepted; no action is required. In a sixth start rule, a description followed by a white-space 1220 is accepted; no action is required.

The nonterminal topic 1232 represents a sequence of content words, corresponding to a phrase in natural language. In a first topic rule, a topic is initialized by a single terminal content-word 1228. In a second topic rule, content is appended to a topic, where a nonterminal topic is followed by a terminal white-space 1220 and a terminal content-word 1228. In a third topic rule, content is appended to a topic, where a nonterminal topic is followed by a terminal dash 1224 and a terminal content-word 1228. In other embodiments, other embedded punctuation characters, such as slash, are also accepted for continuation of derivations of the topic 1232.

The nonterminal stop 1234 represents a delimiter for a sequence of content words representing a topic. In a first stop rule, a terminal punctuation 1222 provides a delimiter. In a second stop rule, a terminal dash 1224 provides a delimiter. In a third stop rule, a terminal function-word 1226 provides a delimiter. In other embodiments, other special-case punctuation would similarly derive stop nonterminals outside of phrase-like context.

The nonterminal topic 1232 is associated with a sequence of terminal content-word 1228. When a topic is accepted, each associated terminal content-word 1228 is processed to determine a canonical instance of the word-class 1076; the processing is provided by the canonical-word 1112. The sequence of word instances may then be used to instantiate an instance of the topic-class 1072. The topic instance is resolved to a canonical instance of the topic-class 1072; the processing is provided by the canonical-topic 1116.

FIG. 21 depicts an example of the exemplary classifier processing a description in natural language to several topics. The notice-description-property 1012 has a value "b.—Web-based manager for bookmarks using XML, Perl". In the lexical analysis stage, the text value is processed to a sequence of terminal tokens, included the content-word 1228 corresponding to the text "b", the punctuation 1222 corresponding to the text ".", the white-space 1220 corresponding to the text " ", etc. In the parse stage, terminals are accumulated to form the topic-category 1018 corresponding to the text "b", including the instance of the word-category 1038 corresponding to the text "b". Terminals are accumulated to form the instance of the topic-category 1018 corresponding to the text "web based manager", including the sequence of instances of the word-category 1038 corresponding to the respective texts "web", "based", and "manager".

13 Presentation

The bookmark manager 1000 includes a presenter 1032, which provides an exemplary presentation of the collection of web bookmarks as a collection of interlinked HTML resources.

Figures 22, 23:
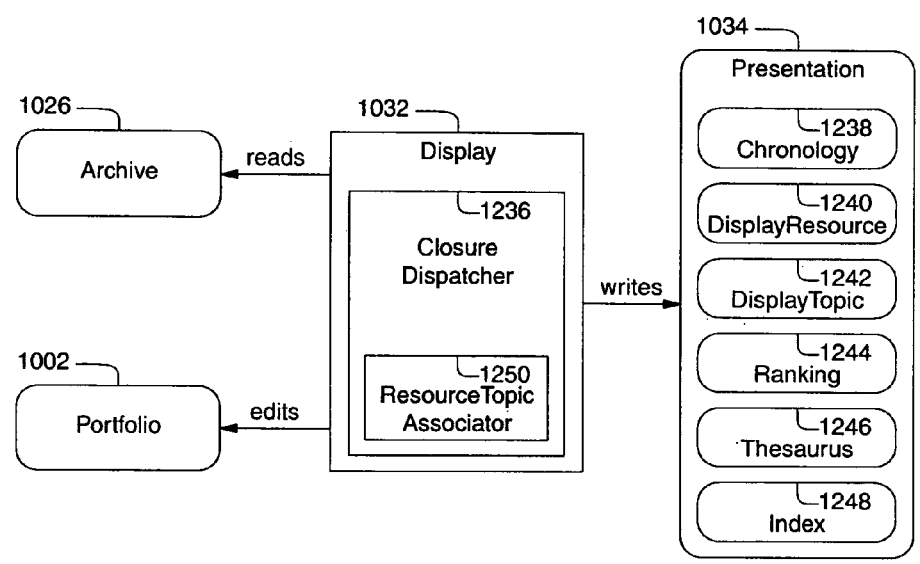
FIG. 22 depicts an exemplary presenter, which reads an archive, edits a portfolio, and writes a presentation.
FIG. 23 depicts exemplary declarations establishing meta relations in the closure dispatcher.

FIG. 22 depicts an exemplary presenter, which reads an archive, edits a portfolio, and writes a presentation. The presenter 1032 reads an archive 1026, editing a portfolio 1002, then processes the portfolio 1002 to write a presentation 1034 of the portfolio 1002 contents. The display computation uses a closure-dispatcher 1236, a specialization of the dispatcher 1166. The presentation includes a chronology-presentation 1238 of notices, a resource-presentation 1240 for each individual resource, a topic-presentation 1242 for each individual topic, a ranking-presentation 1244 of topics, a thesaurus-presentation 1246 of topics, and an index-presentation 1248 of topics.

The closure-dispatcher 1236 specializes the dispatcher 1166. The specialized dispatcher includes a notice-resource-topic-associator 1250 to associate an instance of the resource-category 1010 with one or more instances of the topic-category 1018 via an instance of the notice-category 1004. On dispatch of the association of a notice with a resource, via the resource-has-notice-relation 1156, the custom responder instantiates the implied associations between the resource and the topics associated with the notice.

FIG. 23 depicts exemplary declarations establishing meta relations in the closure dispatcher. The specialized dispatcher is also augmented with meta quality declarations which qualify the topic-genera-association 1056 and the topic-species-association 1058 as transitive associations. The transitivity meta property results in the closure of genera and species topic associations for use in display, although only suffix and prefix genus associations are recorded in the archive 1026.

Figure 24:
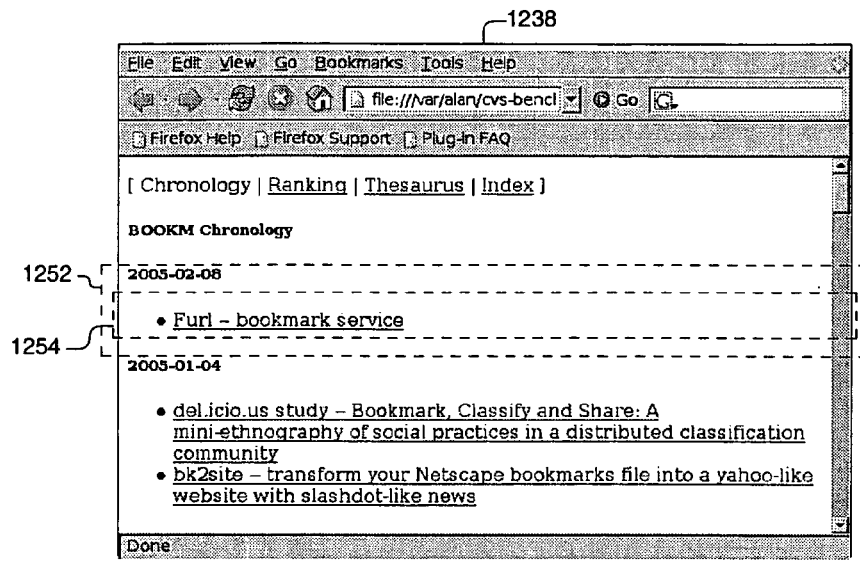
FIG. 24 depicts an exemplary presentation of a chronology of notices from a bookmark collection.

FIG. 24 depicts an exemplary presentation of a chronology of notices from a bookmark collection. The chronology-presentation 1238 presents the instances of the notice-category 1004 in the portfolio 1002. The notices are aggregated by the notice-date-property 1040. The aggregates are presented in reverse chronological order (newest first). For each aggregate of notices on a particular date, a chronology-date-division 1252 is generated, titled by the date. The individual notices in the aggregate are presented in a list, one element per notice, with a chronology-resource-link 1254 to the resource-presentation 1240 corresponding to the notice's resource. The link text is supplied by the notice-description-property 1012.

Figure 25:
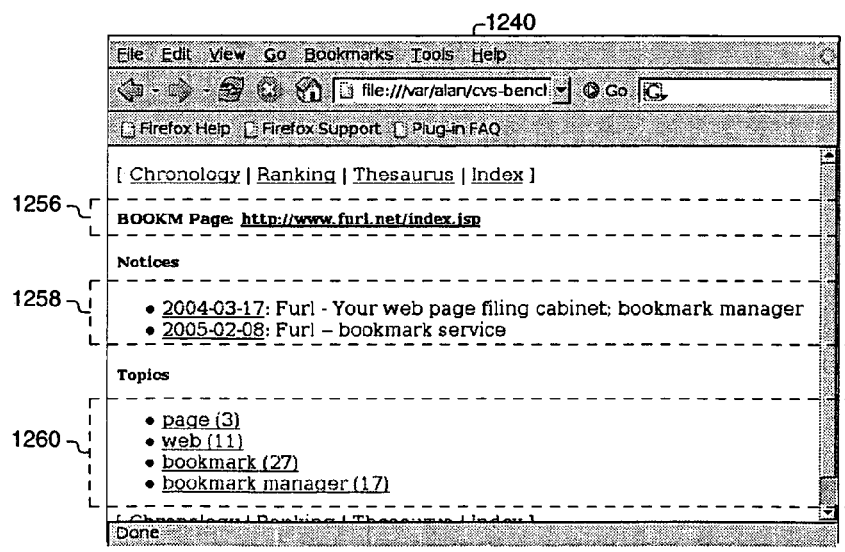
FIG. 25 depicts an exemplary presentation of a resource from a bookmark collection.

FIG. 25 depicts an exemplary presentation of a resource from a bookmark collection. The resource-presentation 1240 presents an instance of the resource-category 1010 in the portfolio 1002. Each resource in the portfolio 1002 is presented individually. The resource presentation includes a display-resource-link 1256 to the referenced resource, as specified by the value of the resource-URI-property 1044. The resource presentation further includes a display-resource-notices-list 1258, indicating the associated instances of the notice-category 1004, with links back to the appropriate chronology-date-division 1252. Also included in the resource presentation is a display-resource-topics-list 1260, indicating the non-trivial topics associated with the resource. Topic triviality is determined by the topic-triviality 1122. For each non-trivial associated topic, a link is provided to the topic's topic-presentation 1242.

Figure 26:
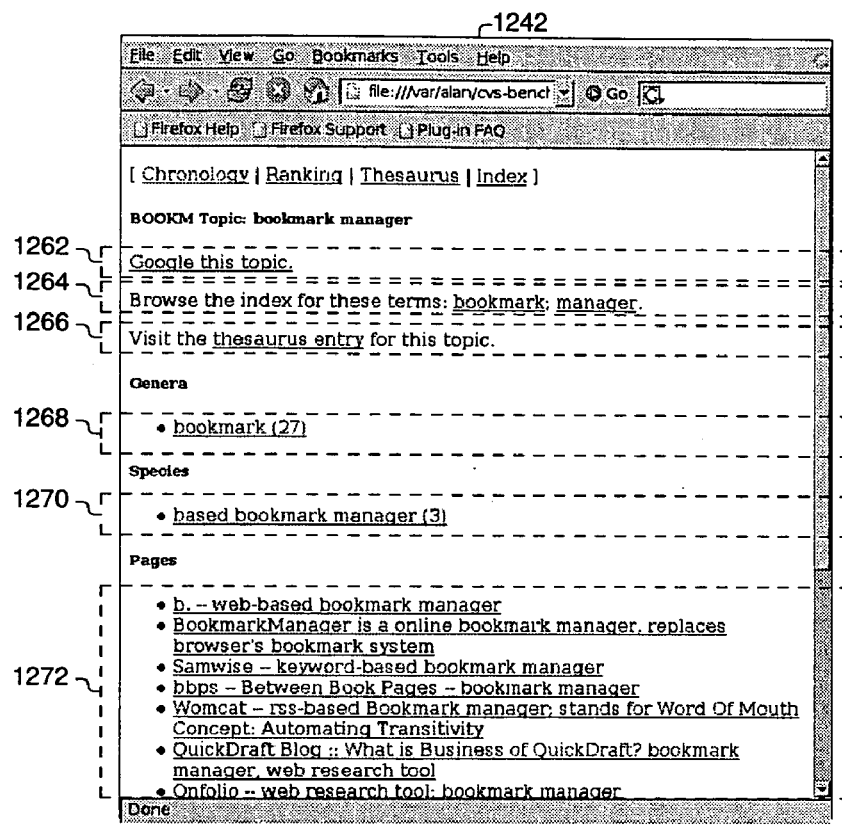
FIG. 26 depicts an exemplary presentation of a topic from a bookmark collection.

FIG. 26 depicts an exemplary presentation of a topic from a bookmark collection. The topic-presentation 1242 presents a non-trivial instance of the topic-category 1018 in the portfolio 1002. Each non-trivial topic in the portfolio 1002 is presented individually. The topic presentation includes a title, incorporating the topic text, a display-topic-search 1262 to a web search for the topic text, and display-topic-index-links 1264 to the division in the index-presentation 1248 for each word associated with the topic. The topic presentation further includes a display-topic-thesaurus-link 1266 to the division for the topic in the thesaurus-presentation 1246, a display-topic-genera-list 1268, containing links to the topic-presentation 1242 for each genus of the topic, if any, as indicated by the topic-genera-association 1056. The topic presentation also includes a display-topic-species-list 1270, containing links to the topic-presentation 1242 for each species for the topic, if any, as indicated by the topic-species-association 1058. The topic presentation also includes a display-topic-resources-list 1272, containing links to the resource-presentation 1240 for each resource associated with the topic. In an alternative embodiment, links are provided into the chronology-presentation 1238 for each instance of the notice-category 1004 from the description of which the topic was obtained.

Figure 27:
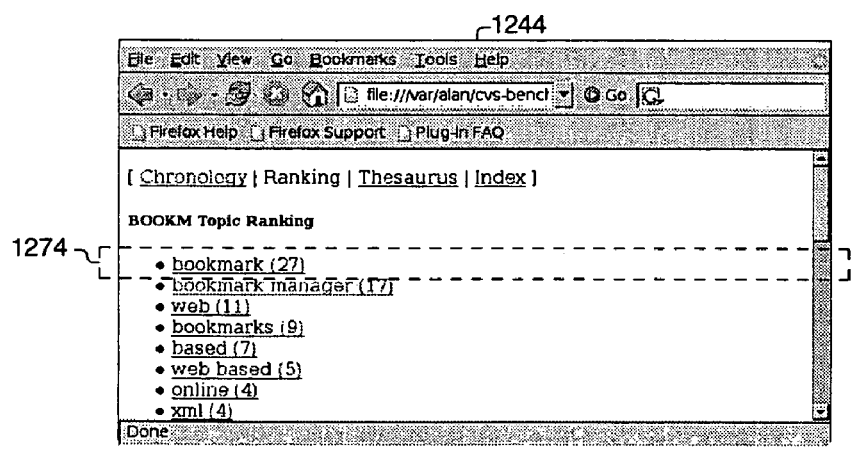
FIG. 27 depicts an exemplary presentation of a ranking of topics for a bookmark collection.

FIG. 27 depicts an exemplary presentation of a ranking of topics for a bookmark collection. The ranking-presentation 1244 presents the non-trivial instances of the topic-category 1018 in the portfolio 1002. A ranking of non-trivial topics is presented. Topics are ranked according to declining count of associated resources (alternatively, associated notices). Each topic in the ranking is presented as a ranking-topic-link 1274 to the particular topic-presentation 1242 for the topic. The count of associated resources (alternatively, associated notices) is also presented.

Figure 28:
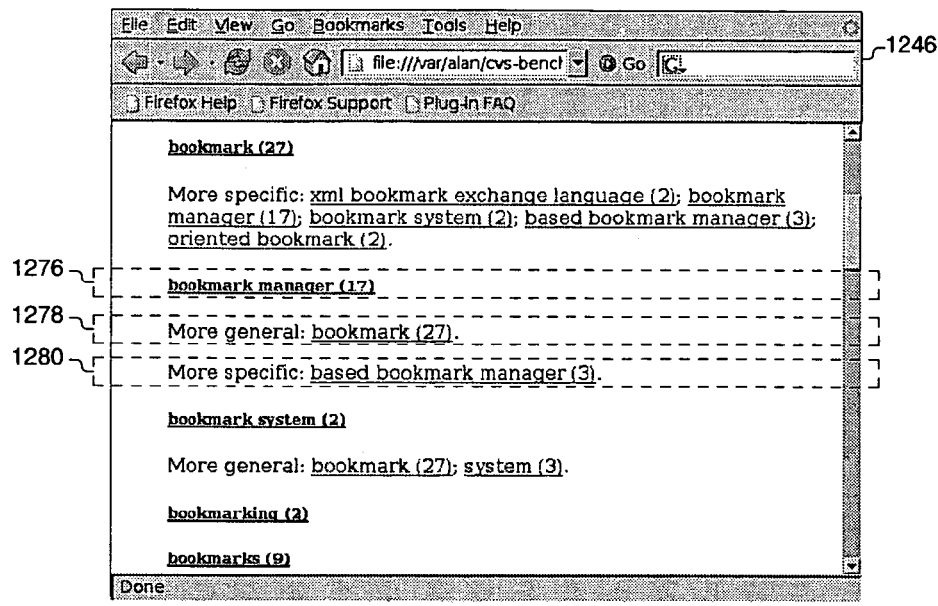
FIG. 28 depicts an exemplary presentation of a taxonomy of topics for a bookmark collection.

FIG. 28 depicts an exemplary presentation of a taxonomy of topics for a bookmark collection. The thesaurus-presentation 1246 presents the non-trivial instances of the topic-category 1018 in the portfolio 1002. Topics in the taxonomy are ordered alphabetically by topic text. For each non-trivial topic in the portfolio 1002, the topic text and count of associated resources is presented in a thesaurus-topic-link 1276 to the particular topic-presentation 1242 for the topic. Non-trivial genera are presented in a thesaurus-genera-list 1278, containing links within the taxonomy presentation. Non-trivial species are presented in a thesaurus-species-list 1280, containing links within the taxonomy presentation.

Figure 29:
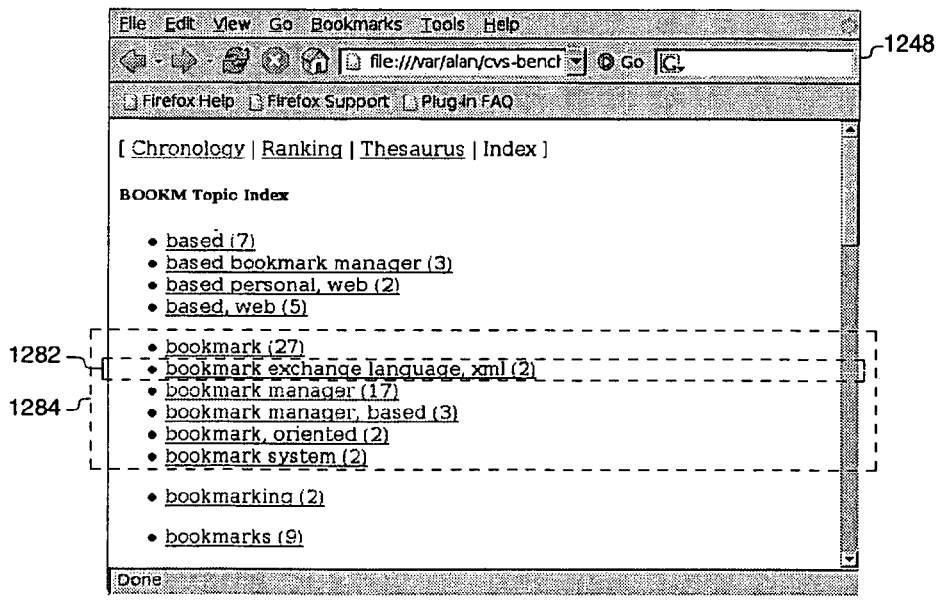
FIG. 29 depicts an exemplary presentation of an index of topics for a bookmark collection.

FIG. 29 depicts an exemplary presentation of an index of topics for a bookmark collection. The index-presentation 1248 presents the non-trivial instances of the topic-category 1018 in the portfolio 1002. For each non-trivial topic, one or more index entries are provided. An index-word-entry 1282 is determined by cyclic permutation of the sequence of words associated with the topic. Each entry links to the particular topic-presentation 1242 for the topic. A index-word-division 1284 is an aggregate of entries sharing a leading word. The index presents the entries in alphabetic order.

I claim:

1. An apparatus for managing a collection of web bookmarks, comprising:
a computing device configured to execute software comprising:
a reader, configured to process a computer-readable archive representing a collection of web bookmarks to produce an object-oriented data structure representing said collection of web bookmarks, said data structure comprising an object-oriented representations of notice events, each notice event comprising
a reference to a web resource, and
a natural language description of said web resource;
a classifier, configured to process notice event, comprising
means for parsing said natural language description to obtain at least one sequence of at least one content word;
means for associating a topic category with said sequence;
means for recursively computing generic topics using non-empty subsequences of content words from the sequence associated with the topic category, wherein the generic topics are used to automatically construct a taxonomy of topics for classifying web resources;
means for associating said reference to a web resource with said topic category; and
a presenter, configured to process said object-oriented data structure to produce a presentation representing said collection of web bookmarks.

2. The apparatus of claim 1, wherein:
said notice event further comprises a date; and
said presenter further comprises means for presenting a plurality of said notice representation in any of forward and reverse chronological order, according to said associated date.

3. The apparatus of claim 1, wherein:
said presentation comprises any of a presentation of said web resource, including presentation of said topic category associated with said web resource; and
a presentation of said topic category, including presentation of said web resource associated with said topic category, and further including a presentation of said taxonomy of topics.

4. The apparatus of claim 1, further comprising:
means for standardizing the form of a word from said sequence of at least one content word, including any of means for normalizing case, means for stemming, and means for substitution of synonyms.

5. The apparatus of claim 1, said parsing means further comprising:
means for performing lexical analysis to decompose said natural language description to a token sequence of one or more instances of terminal tokens, said instances of terminal tokens comprising
instances of a space token,
instances of a punctuation token,
instances of a function word token,
and instances of a content word token; and
means for performing syntactic analysis on said token sequence to obtain said at least one sequence of at least one content word, said sequence obtained by accumulation of a maximal subsequence of instances of the content word token, interspersed with instances of the space token.

6. The apparatus of claim 5, wherein:
said instances of terminal tokens further comprise instances of a dash token, and
said means for syntactic analysis further comprises means for accumulating maximal subsequences of instances of the content word token interspersed with instances of any of the space token and the dash token.

7. The apparatus of claim 1, wherein:
said computer-readable archive is a declarative discourse, and
said reader further comprises means for responding to declarations of said declarative discourse.

8. The apparatus of claim 7, said means for responding to declarations further comprising:
at least one instantiator responsive to declarations including a characteristic relation, said instantiator configured to instantiate an instance of an object-oriented class;
at least one receiver responsive to declarations including a characteristic relation, said receiver configured to associate text identifying a subject entity with a member of an instance of an object-oriented class;
at least one associator responsive to declarations including an association relation; said associator configured to associate a first instance of an object-oriented class with a member of an instance of a second object-oriented class; and
at least one assignor responsive to declarations including a property relation, said assignor configured to associate a scalar value with a member of an instance of an object-oriented class.

9. The apparatus of claim 1, further comprising:
a writer configured to process said object-oriented data structure to produce said computer-readable archive representing said collection of web bookmarks.

10. The apparatus of claim 9, wherein:
said computer-readable archive is a declarative discourse.

11. A method for processing a collection of web bookmarks, comprising the steps of:

receiving at least one bookmark notice, said notice comprising
   a reference to a web resource, and
   a natural language description of said web resource;
parsing said natural language description to obtain at least one sequence of at least one content word;
associating a topic category with said sequence;
recursively computing generic topics using non-empty subsequences of content words from the sequence associated with the tonic category, wherein the generic topics are used to automatically construct a taxonomy of topics for classifying web resources;
associating said web resource with said topic category;
presenting the association of said web resource with said topic category; and
presenting the association of said topic category with said taxonomy of topics.

12. The method of claim 11, further comprising the step of:
standardizing the form of a word from said sequence of at least one content word, including any of normalizing case, stemming, and substitution of synonyms.

13. The method of claim 11, further comprising the steps of:
associating a date with each of said at least one bookmark notice; and
presenting a plurality of said at least one bookmark notice in any of forward and reverse chronological order, according to said associated date.

14. The method of claim 11, wherein said parsing step further comprising the steps of:
performing lexical analysis to decompose said natural language description to a token sequence of one or more instances of terminal tokens, said instances of terminal tokens comprising
   instances of a space token,
   instances of a punctuation token,
   instances of a function word token, and
   instances of a content word token; and
performing syntactic analysis on said token sequence to obtain said at least one sequence of at least one content word, said sequence obtained by accumulation of a maximal subsequence of instances of the content word token, interspersed with instances of the space token.

15. The method of claim 14, wherein said instances of terminal tokens further comprising
instances of a dash token,
and said syntactic analysis step further accumulating maximal subsequences of instances of the content word token, interspersed with instances of any of the space token and the dash token.

16. A method for processing a collection of resource notices to construct a topic taxonomy and classify resources to topics, comprising the steps of:
receiving at least one notice, said notice comprising:
   a reference to a resource, and
   a natural language description of said resource;
parsing said natural language description to obtain at least one sequence of at least one content word;
associating a topic category with said sequence;
recursively computing generic topics using non-empty subsequences of content words from the sequence associated with the tonic category, wherein the generic topics are used to automatically construct a taxonomy of topics for classifying resources to topics; and
associating said resource with said topic category.

17. The method of claim 16, further comprising the step of:
standardizing the form of a word from said sequence of at least one content word, including any means of normalizing case, stemming, and substitution of synonyms.

18. The method of claim 16, wherein said parsing step further comprising the steps of:
performing lexical analysis to decompose said natural language description to a token sequence of one or more instances of terminal tokens, said instances of terminal tokens comprising
   instances of a space token,
   instances of a punctuation token,
   instances of a function word token, and
   instances of a content word token; and
performing syntactic analysis on said token sequence to obtain said at least one sequence of at least one content word, said sequence obtained by accumulation of a maximal subsequence of instances of the content word token, interspersed with instances of the space token.

19. The method of claim 18, wherein said instances of terminal tokens further comprising
instances of a dash token,
and said syntactic analysis step further accumulating maximal subsequences of instances of the content word token, interspersed with instances of any of the space token and the dash token.

\* \* \* \* \*